July 8, 1958    R. J. DUERR    2,842,373
STAND

Filed April 26, 1956    2 Sheets-Sheet 1

INVENTOR.
ROBERT J. DUERR
BY
ATTORNEY

July 8, 1958   R. J. DUERR   2,842,373
STAND
Filed April 26, 1956   2 Sheets-Sheet 2
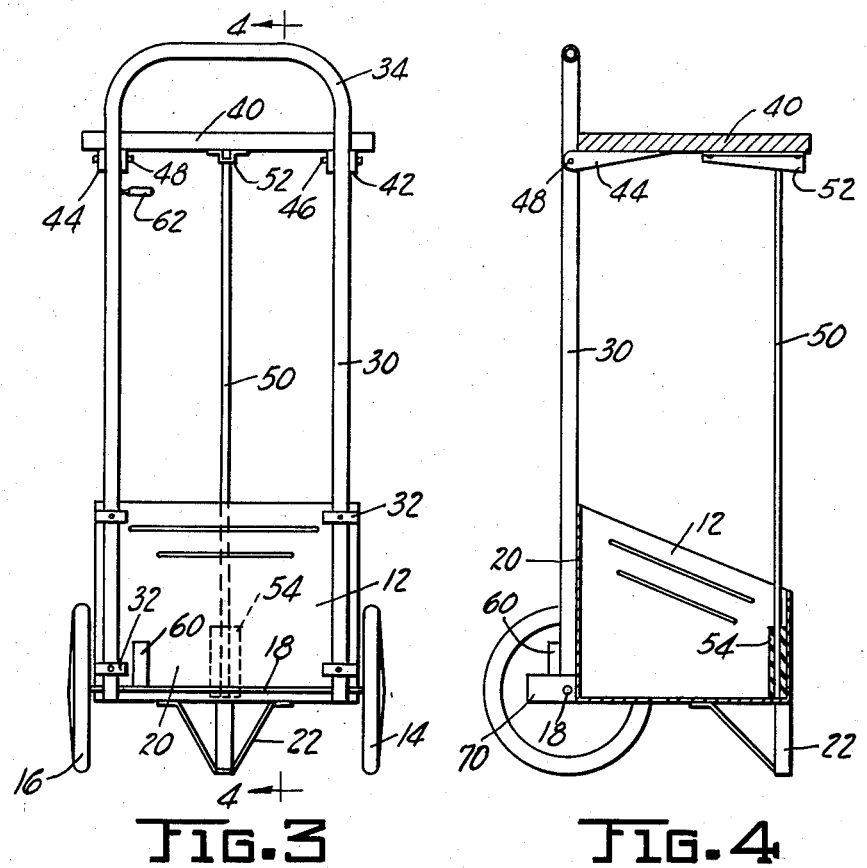

2,842,373
STAND

Robert J. Duerr, South Bend, Ind.

Application April 26, 1956, Serial No. 580,804

2 Claims. (Cl. 280—47.19)

The present invention relates to stands and more particularly to a stand for movie projectors, slide and filmstrip projectors, tape recorders and similar equipment.

One of the principal objects of the present invention is to provide a stand for equipment of the aforesaid type, which is adapted to be converted into a carrier for said equipment and their accessories.

Another object of the invention is to provide a combination stand and cart for the projector equipment, accessories, and the like, which can readily be converted from one to the other without the use of any tools, special equipment or skill.

Still another object of the invention is to provide a combination of the aforesaid type which is so constructed that the projector when in use is well above the level of the heads of the seated audience and when being transported has a position of low center of gravity to facilitate mobility of the stand and to give maximum protection to the projector and accessories.

A further object of the invention is to provide a stand and cart for equipment of the aforesaid type which is sturdy, compact and easy to handle including traversing stairs and which permits good positioning of the said equipment and maximum maneuverability of the cart.

Additional objects and advantages will become apparent from the following description and accompanying drawings wherein:

Figure 3 is an elevational view of the combination stand and cart as it appears when used as a stand;

Figure 4 is a cross sectional view of the combination stand and cart, taken on line 4—4 of Figure 3;

Figures 5 and 6 are detail views of the stand; and

Figure 7 is a detail view of a modification in the foregoing structure.

Figure 1:
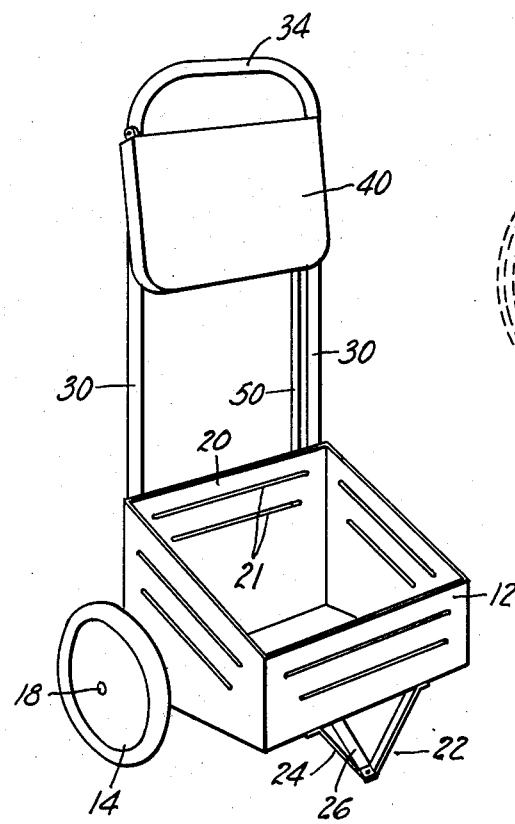
Figure 1 is a perspective view of my combination stand and cart as it appears when used as a cart.

Referring more specifically to the drawings, the stand includes a compartment 12 which is designed to hold a movie projector, reels and projector accessories and is supported a few inches from the floor by wheels 14 and 16 journaled on an axle 18 rigidly secured to the rear panel 20 of compartment 12. The four sides of the compartment which are reinforced by ribs 21 are preferably sufficiently high to give adequate protection to the projector when it is being transported. As pointed out previously herein my stand is adapted to be used for movie projectors, slide and filmstrip projectors, tape recorders and similar equipment; however, for convenience of description the stand will be described as it is used for movie projectors. The description with reference solely to the movie projector is not to be construed as a limitation on the scope of the invention.

When the stand is not being moved the front of the compartment is supported above the floor by a leg 22 attached to the bottom of the compartment and consisting of a V-shaped member 24 riveted to the compartment and a brace 26 riveted to the compartment and to the bottom of the V-shaped member. Leg 22 is of such height that the bottom of the compartment is substantially level when the bracket is resting on the floor. If desired two legs, one at each lower front corner of the compartment, may be used in place of leg 22.

A frame 30 is rigidly secured to the back side of panel 20 by fixtures 32 and extends upwardly therefrom to form a handle portion 34. Pivotally mounted on frame 30 is a platform 40 for supporting the projector when it is being used. The platform is connected to the two vertical members of the frame by hinges 42 and 44 secured to the underside of the platform and pivotally connected to said members by bolts 46 and 48, respectively. The hinges are off-set slightly from the platform so that the platform will fold down parallel to and against the front side of the two vertical members of the frame. The frame is preferably made readily demountable from the compartment in order to facilitate handling of the stand in transporting it by automobile, truck or the like from one location to another.

When my apparatus is being used as a stand to support a projector, the platform is raised to its horizontal position and the front side thereof is supported by a rod 50. The upper end of the rod is placed in a hole in bracket 52 secured to the underside of the platform and the lower end of the rod is placed in a vertical slot in bracket 54 secured to the inside surface of the front panel of compartment 12. Bracket 52 shown in detail in Figures 5 and 6 consists of a wedge-shaped member having a series of holes 56 into which the upper end of rod 50 is placed. The top end of the rod when placed in these holes bears against sloping partition 57 and by selecting the proper hole for the rod, the platform can be adjusted to a level position.

Figure 7 shows a modified form of the adjustment means for rod 50. In this embodiment rod 50 is slightly shorter than in the previous embodiment and a sleeve 59 is threaded onto the upper end of the rod. An extension 58 of about the same diameter as rod 50 is provided on the upper end of sleeve 59 and is adapted to seat in a hole either in the underside of platform 40 or in a bracket attached to the underside of the platform. When an adjustment in the length of rod 50 and sleeve 59 is to be made, the rod and sleeve are rotated relative to one another in the direction to increase or decrease the length the desired amount.

When the platform is folded down into the position which it assumes when the apparatus is being used as a cart, the rod is held in fixtures on or adjacent to one of the vertical members of the frame, consisting, for example, of a cup-like member 60 mounted either on the back side of panel 20 or on the vertical member of the frame for receiving the lower end of the rod and an eye 62 located well up on the corresponding vertical member for receiving the upper end of the rod. For the cup-shaped member, a section of rubber or plastic tubing is preferably used since it minimizes noise created by the rod while the cart is being used.

A holder is preferably provided for the screen and its stand when they are not in use. In Figure 4 a cup-shaped member 70 the size of the screen container is shown attached to the lower rear portion of the compartment. One end of the container is placed in the cup-shaped member and the upper end of the container is strapped or clamped to the handle of the stand.

Figure 2:
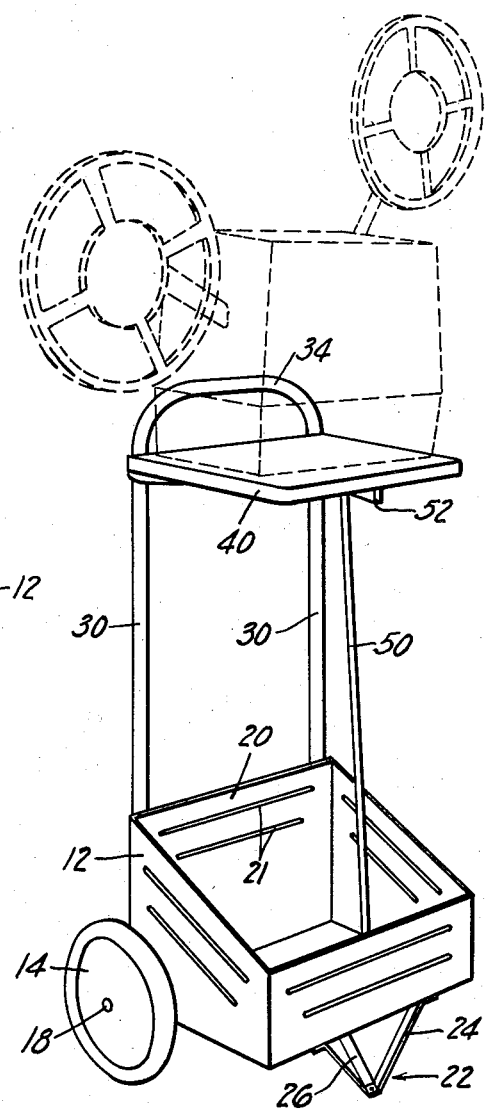
Figure 2 is a perspective view of my combination stand and cart as it appears when used as a movie projector stand.

When the apparatus is to be used as a stand, platform 40 is raised from the position shown in Figure 1 to its horizontal position shown in Figure 2 and the lower end of rod 50 is inserted in the slot of bracket 54 and the upper end of the rod is inserted in one of the holes along bracket 52. The movie projector is then removed from compartment 12 and mounted on platform 40 and the reels are assembled on the projector. If the platform assumes an initial off-level position the upper end of rod 50 is moved from one hole to another until the one which places the platform in a level position is found. Since the two wheels and leg 22 form a tripod arrangement they readily adjust to minor unevenness in the floor or ground on which the stand is placed. When the projector is to be transported to another location, it together with the reels is placed in compartment 12, the platform is lowered to the position shown in Figure 1, and the rod is placed in its holder as previously described. Since the compartment has a low center of gravity between wheels 14 and 16, the cart is easy to maneuver and the projector receives maximum protection during transit.

In the apparatus shown in the drawings, the frame, wheels and compartment are constructed of steel and the platform is constructed of plywood covered on the top surface with rubber, plastic or the like. Other suitable material may be substituted for these if desired.

Various changes can be made in my combination stand and cart without departing from the scope of the present invention. For example, the size and shape of the compartment, platform and frame may be changed to suit requirements. Instead of using solid panels for the sides of the compartment, one or more rods forming a railing may be employed.

I claim:

1. A movie projector stand and cart, comprising vertical members spaced from one another forming a frame, a bottom panel and four vertical side panels forming a compartment attached to said members at the lower portion thereof, a horizontal member connecting said vertical members at the top thereof and forming a handle, a platform pivotally connected to each of said vertical members above said compartment and below said horizontal member and having a raised horizontal position and a lowered vertical position on the same side of said vertical members as said compartment, a tapered member having a series of spaced holes therein on the underside of said platform, a means forming a vertical slot in said compartment, a rod seated at its lower end in said slot and at its upper end in one of said holes, a pair of wheels, an axle for said wheels connected to said vertical members, and a single leg connected to the bottom of said compartment forming a tripod with said wheels for placing said platform in a substantially level position when said platform is in its raised position.

2. An equipment stand and cart, comprising vertical members spaced from one another forming a frame, a bottom panel and four vertical side panels forming a compartment attached to said members at the lower portion thereof, a member connecting said vertical members at the top thereof and forming a handle, a platform pivotally connected to each of said vertical members above said compartment and below said last mentioned member and having a raised horizontal position and a lowered vertical position on the same side of said vertical members as said compartment, a member positioned below said platform for releasably holding said platform in its horizontal position including a means for varying the angularity of said platform, a pair of wheels, an axle for said wheels connected to said vertical members, and a single leg connected to the bottom of said compartment forming a tripod with said wheels for placing said platform in a substantially level position when said platform is in its raised position.

References Cited in the file of this patent

UNITED STATES PATENTS

| 849,557 | Nelson | Apr. 9, 1907 |
| 1,718,962 | Kimball | July 2, 1927 |
| 1,915,802 | Roshnell | June 27, 1933 |
| 2,415,334 | Brown | Feb. 4, 1947 |
| 2,430,107 | Cronrath | Nov. 4, 1947 |
| 2,570,504 | Van House | Oct. 9, 1951 |

FOREIGN PATENTS

| 927,776 | France | May 12, 1947 |